No. 653,043. Patented July 3, 1900.
J. P. STRAND.
NUT LOCK.
(Application filed Apr. 21, 1900.)
(No Model.)
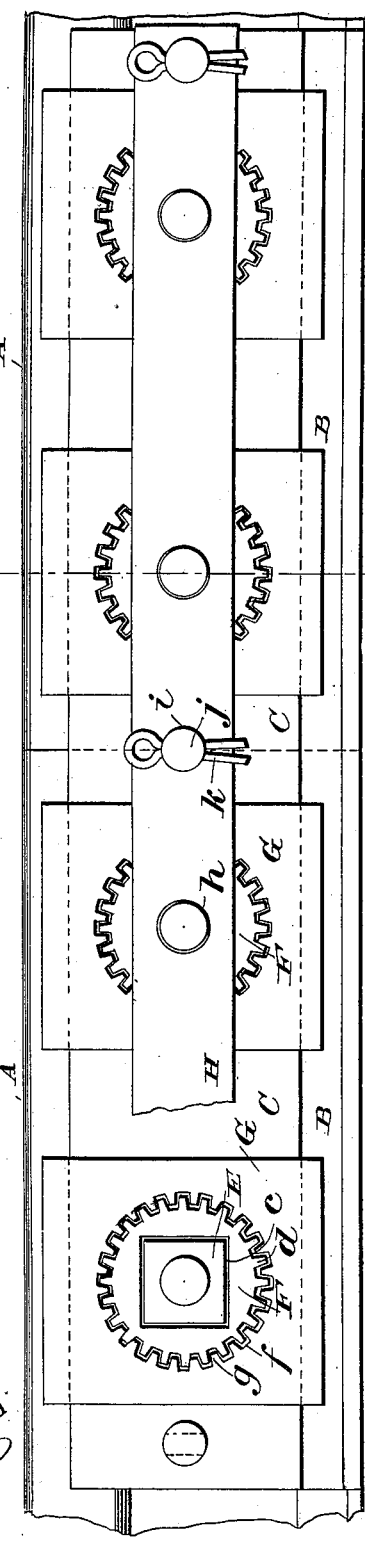
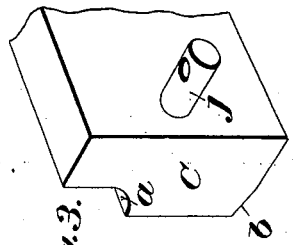
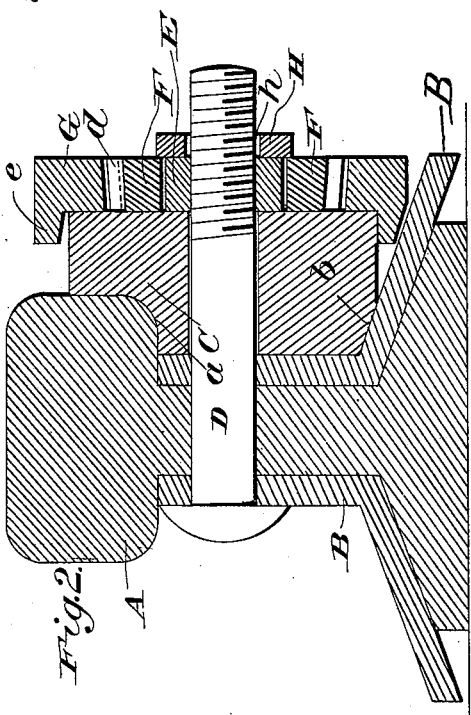
Witnesses
Inventor
John P. Strand.
By James Sheehy
Attorney

UNITED STATES PATENT OFFICE.

JOHN P. STRAND, OF ALTA, IOWA, ASSIGNOR OF ONE-HALF TO ELIAS FORNEY, OF SAME PLACE.

NUT-LOCK.

SPECIFICATION forming part of Letters Patent No. 653,043, dated July 3, 1900.

Application filed April 21, 1900. Serial No. 13,780. (No model.)

*To all whom it may concern:*

Be it known that I, JOHN P. STRAND, a citizen of the United States, residing at Alta, in the county of Buena Vista and State of Iowa, have invented new and useful Improvements in Nut-Locks, of which the following is a specification.

My invention relates to improvements in nut-locks; and it consists in the peculiar and advantageous construction hereinafter described, and particularly pointed out in the claims appended, whereby the several nuts for a railway-rail joint may be expeditiously and securely locked against casual turning.

In the accompanying drawings, Figure 1 is a side elevation of my improved nut-lock with a portion of the retaining-bar broken away. Fig. 2 is an enlarged transverse section taken in the plane indicated by the broken line 2 2 of Fig. 1. Fig. 3 is a broken perspective view illustrating the bar with respect to which the several nuts are secured.

In said drawings similar letters designate corresponding parts in all of the several views, referring to which—

A A are the contiguous ends of two railway-rails.

B B are fish-plates disposed at opposite sides of the rails.

C is what I will for convenience of description term the "lock-bar" of my improved device, since the several nuts are secured with respect thereto.

D D are transverse bolts which rest in coincident apertures in the rails, fish-plates, and bar C, as shown, and E E are angular nuts which are arranged on the threaded ends of the bolts and against the outer side of the bar C.

The lock-bar C is recessed at $a$ to conform to the under side of the heads of the rails and beveled at $b$ to fit the base-flanges of one of the fish-plates, and hence is securely held on the bolts and between the heads of the rails and the flange of the fish-plate.

F F are circular metallic disks which are provided with central apertures $c$ of a shape and size to snugly receive the angular nuts E and are also provided with peripheral radially-disposed teeth $d$.

G G are plates which have inwardly-directed flanges $e$ at their upper and lower edges to engage the upper and lower edges of the bar C and are provided with circular apertures $f$ to receive the disks F and inwardly-directed teeth $g$ on the walls of said apertures designed to intermesh with the teeth $d$ of the disks F after the manner best shown in Fig 1, and H is the retaining-bar. The said retaining-bar is provided at intervals in its length with apertures $h$ of a size to loosely receive the threaded ends of the bolts and is also provided with apertures $i$ to receive the lateral studs $j$ of the bar C, upon which the retaining-bar is designed to be secured by cotter-pins $k$ after the manner shown or other suitable means.

In the practice of my invention after the bolts D are passed through the assembled rails, fish-plates, and bars C and the nuts E are turned up on the bolts to the extent desired the disks F, which correspond in thickness to the nuts, are placed over the same, and the plates G, which also correspond in thickness to the nuts, are placed over the disks, so that their teeth $g$ intermesh with the peripheral teeth of the disks and their flanges $e$ engage the upper and lower edges of the bar C. With this done the bar H is placed on the bolts D and the studs $j$ of bar C and is secured on said studs, when it will serve to retain all of the other parts in the relative positions shown and described.

With the parts in the position shown in Figs. 1 and 2 of the drawings the plates G will be held against turning by the bar C, and the disks F, containing the nuts E, will be effectually prevented from rotating by reason of their peripheral teeth being intermeshed with the teeth of the plates. From this it follows that the nuts will be securely locked and effectually prevented from casually turning in either direction on their respective bolts. However, it will be observed that when it is desired for any reason to remove one or more of the nuts the same may be expeditiously accomplished by releasing the retaining-bar and disengaging the plates G from the bar D and the disks F from the nuts and then turning the nuts off their bolts in the usual manner.

It will be appreciated from the foregoing that by reason of the teeth $d$ $g$ on the disks F and the plates G, respectively, the said plates may be placed in engagement with the disks and the bar C irrespective of the positions of the nuts, which is an important advantage. It will also be appreciated that my improved nut-lock is very strong and durable, and hence calculated to materially contribute to the strength and durability of the rail-joint of which it forms a part.

While my improved nut-lock is designed more particularly for use in a railway-rail joint, it may obviously be used to advantage in other connections, and I therefore do not desire to be understood as confining myself to employing it in conjunction with the rails and fish-plates of a rail-joint.

Having thus described my invention, what I claim is—

1. In a nut-lock, the combination of two parts to be connected, a threaded bolt extending through said parts, a lock-piece arranged on the bolt and engaging one of the parts to be connected so as to be held against rotation, an angular nut mounted on the bolt, a circular disk having an angular aperture snugly receiving the nut and also having peripheral teeth, a plate having a circular aperture snugly receiving the disk, and teeth on the wall of said aperture intermeshed with those of the disk, and also having flanges engaging the lock-pieces, and means for retaining the disk in engagement with the lock-pieces, substantially as specified.

2. In a nut-lock, the combination of two parts to be connected, a threaded bolt extending through said parts, a lock-piece arranged on the bolt and engaging one of the parts to be connected so as to be held against rotation, and having outwardly-extending apertured studs, an angular nut mounted on the bolt, a circular disk having an angular aperture snugly receiving the nut and also having peripheral teeth, a plate having a circular aperture snugly receiving the disk, and teeth on the wall of said aperture intermeshed with those of the disk, and also having flanges engaging the lock-piece, a retaining-bar having an aperture receiving the threaded bolt and other apertures receiving the studs of the lock-piece, and means for securing said bar on the studs of the lock-piece, substantially as specified.

3. In a nut-lock, the combination of two railway-rails arranged end to end, fish-plates disposed at opposite sides of said rails, threaded bolts extending through coincident apertures in the rails and fish-plates, a lock-bar arranged alongside one of the fish-plates and partially below the heads of the rails and having lateral studs provided with apertures, angular nuts mounted on the bolts, circular disks having angular apertures snugly receiving the nuts, and also having peripheral teeth, plates having circular apertures snugly receiving the disks, and teeth on the walls of said apertures intermeshed with those of the disks, and also having flanges engaging the lock-pieces, a retaining-bar having apertures receiving the threaded bolts and other apertures receiving the studs of the lock-bar, and means for securing and retaining said bar on the studs of the lock-bar, substantially as specified.

In testimony whereof I have hereunto set my hand in presence of two subscribing witnesses.

JOHN P. STRAND.

Witnesses:
F. F. CREPPS,
G. O. HUTSON.